US011563857B2

(12) United States Patent
Kakulamarri et al.

(10) Patent No.: US 11,563,857 B2
(45) Date of Patent: Jan. 24, 2023

(54) AGGREGATING HARDWARE LOOPBACK (71) Applicant: Microsoft Technology Licensing, LLC, Redmond, WA (US)

(72) Inventors: Laxmi Narsimha Rao Kakulamarri, Redmond, WA (US); Edward Sumanaseni, Sammamish, WA (US); Egidio Sburlino, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 269 days.

(21) Appl. No.: 16/428,318

(22) Filed: May 31, 2019

(65) Prior Publication Data

US 2020/0382648 A1    Dec. 3, 2020

(51) Int. Cl.
H04B 3/23 (2006.01)
H04M 9/08 (2006.01)
H04L 65/4038 (2022.01)

(52) U.S. Cl.
CPC ............ *H04M 9/082* (2013.01); *H04B 3/234* (2013.01); *H04B 3/238* (2013.01); *H04L 65/4038* (2013.01)

(58) Field of Classification Search
CPC ...... H04M 9/082; H04M 3/568; H04B 3/234; H04B 3/238; H04L 65/4038; H04L 27/0008; H04L 1/241; H04N 5/602; G10L 19/167; G06F 17/241; G06F 40/00
USPC .................................................... 379/406.08
See application file for complete search history.

(56) References Cited

U.S. PATENT DOCUMENTS

| 2008/0192640 | A1* | 8/2008 | Simpson ................. H04L 1/241 370/249 |
| 2012/0089394 | A1* | 4/2012 | Teodosiu ................ G06F 40/00 704/235 |
| 2012/0245718 | A1 | 9/2012 | Condit et al. |
| 2014/0292999 | A1* | 10/2014 | Do ......................... G06F 17/241 348/14.07 |
| 2016/0072958 | A1* | 3/2016 | McIntosh ............. H04R 1/1016 455/416 |
| 2018/0227414 | A1 | 8/2018 | Kim et al. |
| 2020/0351465 | A1* | 11/2020 | Wolff ..................... H04N 5/765 |
| 2021/0098011 | A1* | 4/2021 | George ................. G10L 19/167 |

FOREIGN PATENT DOCUMENTS

| WO | 2010106469 A1 | 9/2010 |
| WO | 2015107382 A1 | 7/2015 |

OTHER PUBLICATIONS

"International Search Report and Written Opinion issued in PCT Application No. PCT/US20/029417", dated Jul. 8, 2020, 12 Pages.

* cited by examiner

Primary Examiner — Md S Elahee
(74) Attorney, Agent, or Firm — Ray Quinney & Nebeker; Tiffany Healy (57) ABSTRACT Methods and devices for aggregating hardware loopback streams of a plurality of display devices in communication with a computer device may include a plurality of hardware loopback streams with rendered audio data from the plurality of display devices in communication with the computer device. The methods and devices may include combining the rendered audio data from the plurality of hardware loopback streams into a loopback buffer to create aggregated loopback audio data. The methods and devices may include providing the loopback buffer with the aggregated loopback audio data to one or more applications executing on the computer device.

14 Claims, 4 Drawing Sheets

AGGREGATING HARDWARE LOOPBACK

BACKGROUND

The present disclosure relates to multiple devices in communication with a computer device.

Applications may want to use a loopback audio stream of the audio data being rendered to a speaker for various processing. For example, applications may want to use a loopback audio stream for echo cancellation or recording audio for the application. When multiple devices are communicating with a computer device, there may be a plurality of loopback streams an application may need to access for the processing and it may become cumbersome for the application to determine which loopback stream to access.

Thus, there is a need in the art for improvements for audio loopback on devices.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, at least one processor configured to communicate with the memory, and an operating system configured to receive a plurality of hardware loopback streams with rendered audio data from a plurality of display devices in communication with the computer device, wherein each hardware loopback stream of the plurality of hardware loopback streams corresponds to one display device of the plurality of display devices; combine the rendered audio data from the plurality of hardware loopback streams into a loopback buffer to create aggregated loopback audio data; and provide the loopback buffer with the aggregated loopback audio data to one or more applications executing on the computer device.

Another example implementation relates to a method for aggregating hardware loopback streams of a plurality of display devices in communication with a computer device. The method may include receiving, at an operating system executing on the computer device, a plurality of hardware loopback streams with rendered audio data from the plurality of display devices in communication with the computer device, wherein each hardware loopback stream of the plurality of hardware loopback streams corresponds to one display device of the plurality of display devices. The method may include combining the rendered audio data from the plurality of hardware loopback streams into a loopback buffer to create aggregated loopback audio data. The method may include providing the loopback buffer with the aggregated loopback audio data to one or more applications executing on the computer device.

Another example implementation relates to computer-readable medium storing instructions executable by a computer device. The computer-readable medium may include at least one instruction for causing the computer device to receive a plurality of hardware loopback streams with rendered audio data from a plurality of display devices in communication with the computer device, wherein each hardware loopback stream of the plurality of hardware loopback streams corresponds to one display device of the plurality of display devices. The computer-readable medium may include at least one instruction for causing the computer device to combine the rendered audio data from the plurality of hardware loopback streams into a loopback buffer to create aggregated loopback audio data. The computer-readable medium may include at least one instruction for causing the computer device to provide the loopback buffer with the aggregated loopback audio data to one or more applications executing on the computer device.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for aggregating hardware loopback streams received from a plurality of display devices in communication with a computer device and representing the aggregated hardware loopback streams in a single loopback buffer. As used herein, a hardware loopback stream may include audio data being rendered to the speakers on the display devices for output. The methods and devices may perform additional processing on the audio data before storing the rendered audio data in the hardware loopback streams in the loopback buffer. The additional processing may occur prior to the output of the audio via the speakers. The additional processing may include, but is not limited to, equalization, filtering, pitch shift, and/or any other effect on the audio data. As such, the hardware loopback streams may accurately represent the audio coming out of the speakers on the display devices. The methods and devices may use a hardware loopback stream instead of copying the output signal sent to the speakers as, for example, currently performed by software loopback streams. Software loopback streams may not accurately represent the audio coming out of the speakers on the display devices since the software loopback streams may capture the audio data before the audio data is rendered to the speakers for output and/or prior to any additional processing that may occur on the audio data prior to output. As such, using the hardware loopback streams by applications may be more efficient than using software loopback streams since the hardware loopback streams may provide a more accurate representation of the sound produced by the speakers on the display devices relative to the software loopback streams.

The plurality of display devices may communicate with the computer device via a network or bus protocol, such as, for example, a universal serial bus (USB) connection. The display devices may have at least one display and corresponding audio inputs and/or audio outputs. The display devices may be any type of display, monitor, visual presentation device, computer device, and/or physical panel capable of presenting information, capturing audio, and/or emitting audio. In addition, each display device may include any number of channels for capturing audio and/or emitting audio. Each speaker and/or microphone of the display devices may correspond to any number of channels. The computer device and/or applications running on the computer device may then access the stored aggregated hardware loopback stream to improve one or more operations or outputs associated with the aggregated hardware loopback stream. For example, in a system that captures hardware loopback data in the form of audio data, the improved operations or outputs may include, but are not limited to, performing echo cancellation and/or obtaining an accurate recording of the audio played by a particular output device (also referred to as a render device).

The display devices may have loopback capabilities within the hardware of the display device that enable the audio data being rendered to the speakers of the display devices to be provided in a hardware loopback stream. The audio data rendered to the speakers may include the audio data for output via the speakers on the display devices. The display devices may include hardware loopback units to receive the audio data currently being rendered to a render device, e.g., a speaker, of the display device. The hardware loopback units may create a hardware loopback stream for the rendered audio data. A hardware loopback stream with the rendered audio data may be stored in the display device loopback buffer. As such, the hardware loopback stream stored on the display device may accurately represent the audio output from the speakers on the display device.

One example may include a person using a microphone on a SKYPE call with a friend while some background music is playing on the speaker. In this case the audio captured from microphone on the SKYPE call may also include the audio from the background music if it is in close proximity to the speaker. Using the hardware loopback stream, the speaker audio (e.g., background music) may be cancelled from the microphone audio so that the friend on the SKYPE call does not hear the background music in the call.

The computer device may receive the hardware loopback streams with the audio data from a plurality of display devices. The audio aggregator driver may aggregate the audio data from each of the received hardware loopback streams into a single loopback buffer. The size of the loopback buffer may be determined by multiplying a total number of display devices in communication with the computer device by a number of audio channels supported by each display device. Each of the hardware loopback streams from the different display devices may be combined together into a single loopback buffer. The audio aggregator driver may provide the single loopback buffer to one or more applications associated with computer device.

Applications associated with the computer device may want to use the aggregated loopback audio data from the display devices for additional processing, such as, but not limited to, acoustic echo cancellation and/or recording audio coming out of the speakers. At any time applications may access the loopback buffer and may use the same audio output by the speakers on the display device by accessing the corresponding hardware loopback stream containing the audio data. By using hardware loopback, a better representation of the audio data rendered to the display devices speakers may be recorded in the hardware loopback streams, aggregated in the single loopback buffer, and used by the applications.

Figure 1:
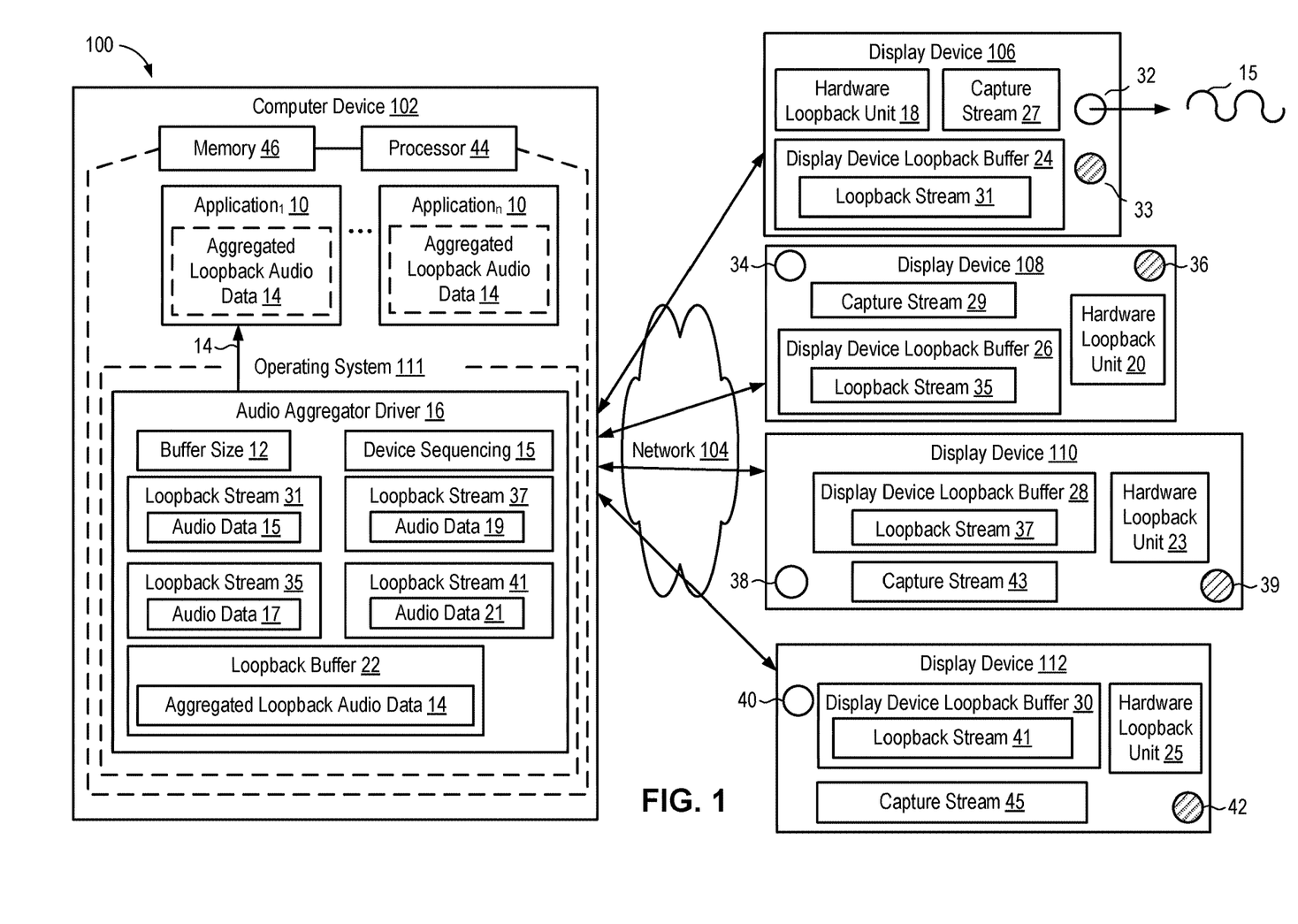
FIG. 1 is a schematic block diagram of an example computer device in communication with a plurality of display devices in accordance with an implementation of the present disclosure.

Referring now to FIG. 1, is a system 100 for aggregating hardware loopback streams from a plurality of display devices 106, 108, 110, 112 includes a computer device 102 in communication with the display devices via a wired or wireless network 104. In an implementation, display devices 106, 108, 110, 112 may communicate with computer device 102 via a network or bus protocol, such as, for example, a USB connection. Display devices 106, 108, 110, 112 may have at least one display and a corresponding audio input and/or audio output. Display devices 106, 108, 110, 112 may be any type of display, monitor, visual presentation device, computer device, and/or physical panel capable of presenting information, capturing audio, and/or emitting audio.

In addition, each display device 106, 108, 110, 112, may include any number of channels for capturing audio and/or emitting audio. For example, display device 106 may include speaker 32 that supports two channels (e.g., right and left) and may include a microphone 33. Display device 108 may include speaker 34 that supports two channels (e.g., right and left) and may include a microphone 36. Display device 110 may include speaker 38 that supports two channels (e.g., right and left) and may include a microphone 39. Display device 112 may include speaker 40 that supports two channels (e.g., right and left) and may include a microphone 42. Each speaker 32, 34, 38, 40 and/or microphone 33, 36, 39, 42 of display devices 106, 108, 110, 112 may correspond to any number of channels.

Each of the display devices 106, 108, 110, 112 may include hardware loopback capabilities so that anytime audio data is rendered for output from one or more speakers 32, 34, 38, 40 on display devices 106, 108, 110, 112, the rendered audio data may be obtained by a hardware loopback unit 18, 20, 23, 25 on display devices 106, 108, 110, 112. Display devices 106, 108, 110, 112 may have internal hardware to redirect the final stream of rendered audio data 15 to the hardware loopback units 18, 20, 23, 25. The rendered audio data 15 for output may include any additional processing performed on the rendered audio data 15. The additional processing may include, but is not limited to, equalization, filtering, pitch shift, base boost, and/or any other effect on the audio. In addition, the rendered audio data 15 may include a mix of audio data for a plurality of applications 10 actively rendering audio for output. For example, a music application may be playing music on display device 106 at the same time a video conference application may have a video call on display device 106. Both applications may be actively rendering audio for output via speaker 32 and the rendered audio data 15 may include the audio data for both the music application and the video conference application.

The rendered audio data 15 may be stored in hardware loopback stream 31 in a display device loopback buffer 24. As such, hardware loopback stream 31 may accurately represent the audio output from the speaker 32 on display device 106. Similarly (but without the rendered audio data illustrated), display device loopback buffer 26 may include hardware loopback stream 35 with the rendered audio data 17 for display device 108. The rendered audio data 17 may correspond to the audio output from speaker 34. Also similarly (but without the rendered audio data illustrated), display device loopback buffer 28 may include hardware loopback stream 37 with the rendered audio data 19 from display device 110. The rendered audio data 19 may correspond to the audio output from speaker 38. Further, and similarly (but without the rendered audio data illustrated), display device loopback buffer 30 may include hardware loopback stream 41 with the rendered audio data 21 from display device 112. The rendered audio data 21 may correspond to the audio output from speaker 40.

Display devices 106, 108, 110, 112 may also include capture streams 27, 29, 43, 45 with any audio captured by microphones 33, 36, 39, 42. For example, if a person speaks into microphone 33 of display device 106, capture stream 27 may include the captured audio data from the person speaking. In addition, if background music is playing nearby microphone 42 of display device 112, capture stream 45 may include the audio data corresponding to the background music.

Computer device 102 may include any mobile or fixed computer device, which may be connectable to a network. Computer device 102 may be, for example, a computer device such as a desktop or laptop or tablet computer, an internet of things (IOT) device, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Computer device 102 may include an operating system 111 may be executed by processor 44 and/or memory 46. Memory 46 of computer device 102 may be configured for storing data and/or computer-executable instructions defining and/or associated with operating system 111, and processor 44 may execute such data and/or instructions to instantiate operating system 111. An example of memory 46 can include, but is not limited to, a type of memory usable by a computer, such as random access memory (RAM), read only memory (ROM), tapes, magnetic discs, optical discs, volatile memory, non-volatile memory, and any combination thereof. An example of processor 44 can include, but is not limited to, any processor specially programmed as described herein, including a controller, microcontroller, application specific integrated circuit (ASIC), field programmable gate array (FPGA), system on chip (SoC), or other programmable logic or state machine.

Operating system 111 may include an audio aggregator driver 16 that may receive one or more hardware loopback streams 31, 35, 37, 41 with the rendered audio data 15, 17, 19, 21 from one or more display device loopback buffers 24, 26, 28, 30. Hardware loopback streams 31, 35, 37, 41 may accurately represent the audio output from speakers 32, 34, 38, 40 on display devices 106, 108, 110, 112.

Audio aggregator driver 16 may generate a single loopback buffer 22 for the rendered audio data 15, 17, 19, 21. Audio aggregator driver 16 may determine a buffer size 12 for the loopback buffer 22. The buffer size 12 may be calculated by multiplying the total number of display devices 106, 108, 110, 112 by the number of channels supported by each of the display devices 106, 108, 110, 112. In the illustrated example, display devices 106, 108, 110, 112 may each support two channels (e.g., speakers 32, 34, 38, 40 may support two channels, right and left). As such, the buffer size 12 may be eight (e.g., four devices multiplied by two channels).

Audio aggregator driver 16 may partition the loopback buffer 22 into a plurality of sections, where the number of sections correspond to the buffer size 12. For example, the loopback buffer 22 may be partitioned into eight sections, where each individual section may correspond to a single channel supported by display devices 106, 108, 110, 112. A sequencing may be applied to the number of sections so that each section may correspond to a specific display device loopback stream 31, 35, 37, 41. The sequencing may be in response to an order in which display devices 106, 108, 110, 112 are connected and/or in communication with computer device 102. The number of sections allocated to a specific display device loopback stream 31, 35, 37, 41 may be in response to a number of channels supported by display devices 106, 108, 110, 112. For example, each display device 106, 108, 110, 112 may receive two sections in the loopback buffer 22 since display devices 106, 108, 110, 112 support two channels.

Audio aggregator driver 16 may combine the rendered audio data 15, 17, 19, 21 received from display devices 106, 108, 110, 112 into the loopback buffer 22. For example, the rendered audio data 15, 17, 19, 21 received from display device loopback streams 31, 35, 37, 41 may be placed into different sections of the loopback buffer 22 in a specified order resulting in the aggregated loopback audio data 14. As such, audio aggregator driver 16 may represent the aggregated loopback audio data 14 from the various hardware loopback streams 31, 35, 37, 41 as one by using a single loopback buffer 22.

Audio aggregator driver 16 may provide the loopback buffer 22 to one or more applications 10 associated with computer device 102. Applications 10 may want to use the aggregated loopback audio data 14 for various processing. One example may include application 10 using the aggregated loopback audio data 14 to perform echo cancellation on audio output from one or more displays 106, 108, 110, 112. For example, when an individual is using a microphone 33 on display device 106 on a SKYPE call with a friend while some background music is playing on speaker 32, capture stream 27 may include the audio from microphone 33 (e.g., the individual speaking) and audio from speaker 32 (e.g., background music). Application 10 may use the aggregated loopback audio data 14 in the loopback buffer 22 to cancel out the audio from speaker 32 (e.g., the background music) so the friend does not hear the background music in the call. In another example, application 10 may want to record the audio emitted by one or more speakers 32, 34, 38, 40 on display devices 106, 108, 110, 112. Application 10 may use the aggregated loopback audio data 14 and/or a portion of the aggregated loopback audio data 14 for the recording. For example, application 10 may identify a portion of the aggregated loopback audio data 14 that corresponds to display device 110 and may extract the aggregated loopback audio data 14 and/or a portion of the aggregated loopback audio data 14 associated with display device 110 (e.g., audio data 17) for the recording.

As such, at any time applications 10 may access the loopback buffer 22 and may be able to use the same audio output by the speakers 32, 34, 38, 40 on any of the display devices 106, 108, 110, 112 through the aggregated loopback audio data 14. Moreover, since hardware loopback corresponds more closely to the audio output by the display devices 106, 108, 110, 112 than a stored stream of data input to the speakers of the respective display devices, a better representation of the audio output by the display devices 106, 108, 110, 112 may be used by the applications 10.

Figure 2:
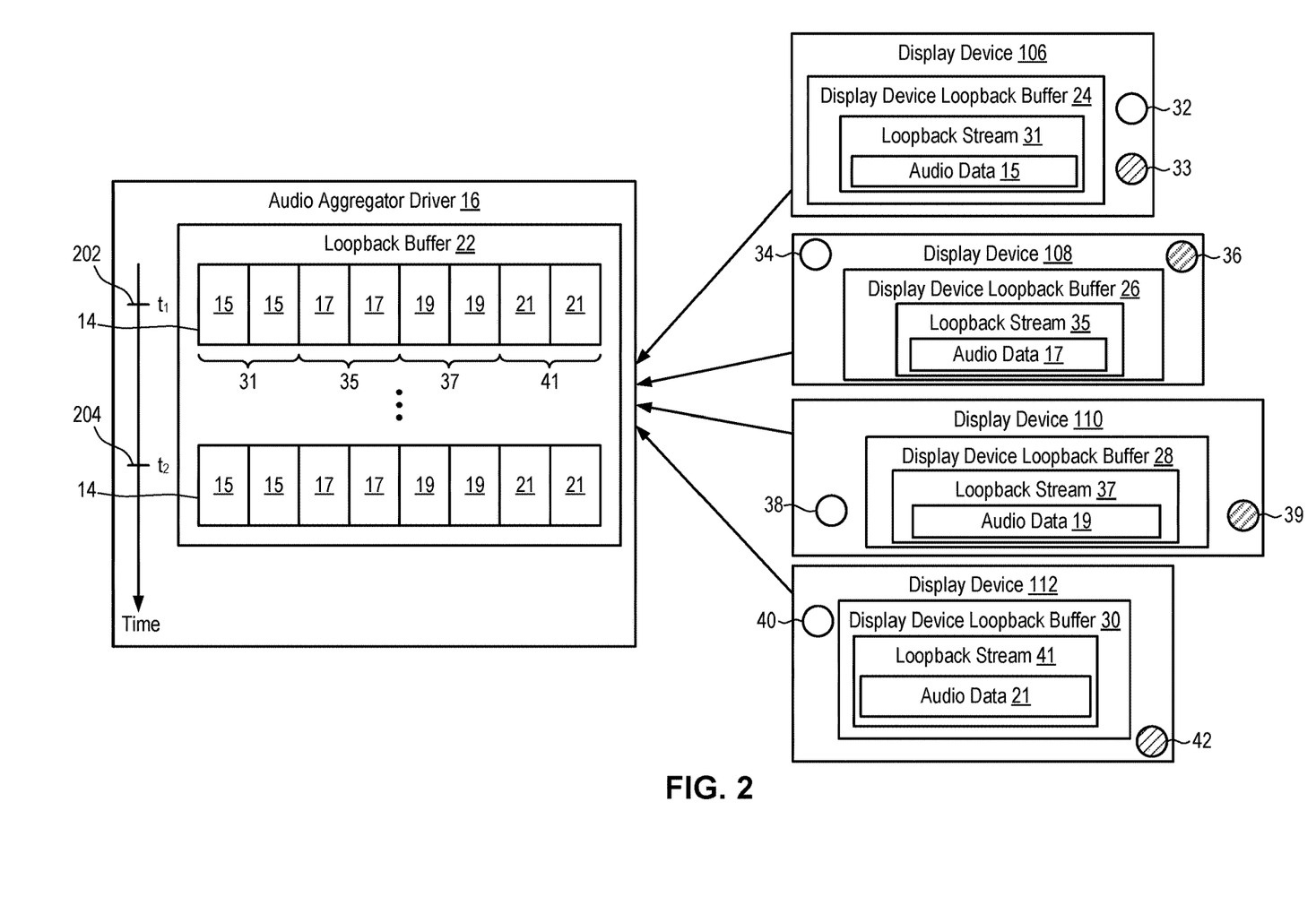
FIG. 2 is an example of a loopback stream in accordance with an implementation of the present disclosure.

Referring now to FIG. 2, an example loopback buffer 22 is illustrated. Audio aggregator driver 16 may partition loopback buffer 22 into a number of sections corresponding to the buffer size 12 (FIG. 1). For example, when the buffer size 12 is equal to eight, the loopback buffer 22 may be partitioned into eight sections, where each individual section may correspond to a single channel supported by display devices 106, 108, 110, 112. A subset of the number of sections allocated to a specific loopback stream 31, 35, 37, 41 may be in response to a number of channels supported by display devices 106, 108, 110, 112. For example, each display device 106, 108, 110, 112 may receive a subset of two sections in the loopback buffer 22 because display devices 106, 108, 110, 112 support two channels.

A sequencing may be applied to the number of sections so that each section may correspond to a specific hardware loopback stream 31, 35, 37, 41. The sequencing may have an arrangement (or relative position) based on a value of an order in which display devices 106, 108, 110, 112 are connected and/or in communication with computer device 102. For example, display device 106 may be a first display device and the first two sections of loopback buffer 22 may be allocated to hardware loopback stream 31. The rendered audio data 15 from display device 106 may be stored in the first two sections of loopback buffer 22.

Display device 108 may be the second display device and the next two sections of loopback buffer 22 may correspond to hardware loopback stream 35. The rendered audio data 17 from display device 108 may be stored in the next two sections of loopback buffer 22. Display device 110 may be the third display device and the following two sections of loopback buffer 22 may be associated with hardware loopback stream 37. The rendered audio data 19 from display device 110 may be stored in the following two sections of loopback buffer 22.

Display device 112 may be the fourth display device and the last two sections of loopback buffer 22 may correspond to hardware loopback stream 41. As such, the rendered audio data 21 from display device 112 may be stored in the last two sections of loopback buffer 22.

Loopback buffer 22 may include aggregated loopback audio data 14 corresponding to different time/sequences 202, 204 of when audio may be output from display devices 106, 108, 110, 112. Loopback buffer 22 may include an array of eight sections of rendered audio data 15, 17, 19, 21 (at each time/sequence). For example, at 202 (corresponding to time ($t_1$)), loopback buffer 22 may include any rendered audio data 15, 17, 19, 21 from one or more display devices 106, 108, 110, 112. For example, at 204 (corresponding to time ($t_1$)), loopback buffer 22 may include any rendered audio data 15, 17, 19, 21 from one or more display devices 106, 108, 110, 112.

The rendered audio data 15, 17, 19, 21 may be combined together using a sequencing of the display devices 106, 108, 110, 112 having an arrangement (or relative position) based on a value of the order in which display devices 106, 108, 110, 112 are connected and/or in communication with computer device 102. The combined rendered audio data 15, 17, 19, 21 may result in the aggregated loopback audio data 14. As such, the aggregated loopback audio data 14 may include a mix of audio data for one or more applications actively rendering audio for output on display devices 106, 108, 110, 112. For example, display device 108 may include a music application playing music via speaker 34. Display device 110 may include a media application playing a movie via speaker 38 and a conference call application conducing a call via speaker 38. The aggregated loopback audio data 14 may include a mix of audio data for the music application, the media application, and the conference call application. The aggregated loopback audio data 14 may be provided to one or more applications 10 (FIG. 1) on computer device 102 (FIG. 1) for use by applications 10.

Figure 3:
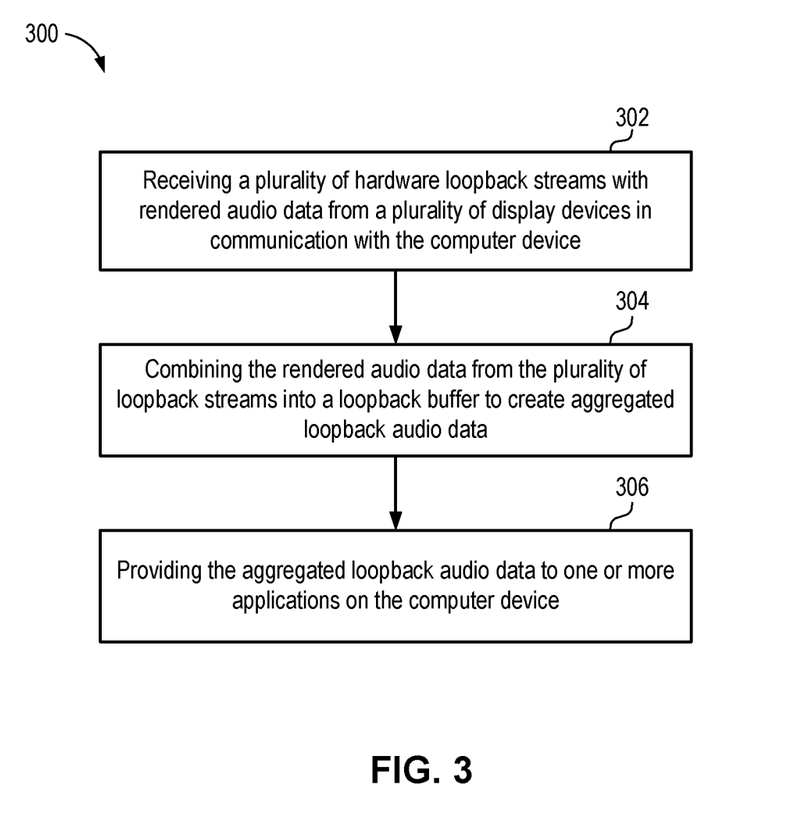
FIG. 3 is an example of a method for aggregating hardware loopback streams of a plurality of devices in communication with a computer device in accordance with an implementation of the present disclosure.

Referring now to FIG. 3, an example method 300 may be used by computer device 102 (FIG. 1) for aggregating hardware loopback streams 31, 35, 37, 41 (FIG. 1) of a plurality of display devices 106, 108, 110, 112 (FIG. 1) in communication with computer device 102. The actions of method 300 may be discussed below with reference to the architecture of FIG. 1.

At 302, method 300 may include receiving a plurality of hardware loopback streams with rendered audio data from a plurality of display devices in communication with the computer device. Display devices 106, 108, 110, 112 may have at least one display and a corresponding audio input and/or audio output. Display devices 106, 108, 110, 112 may be any type of display, monitor, visual presentation device, computer device, and/or physical panel capable of presenting information, capturing audio, and/or emitting audio.

In addition, each display device 106, 108, 110, 112, may include any number of channels for capturing audio and/or emitting audio. Each speaker 32, 34, 38, 40 and/or microphone 33, 36, 39, 42 of display devices 106, 108, 110, 112 may correspond to any number of channels.

Moreover, each of the display devices 106, 108, 110, 112 may include hardware loopback capabilities so that anytime audio output occurs from one or more speakers 32, 34, 38, 40 on display devices 106, 108, 110, 112, the rendered audio data 15, 19, 17, 21 for output via speakers 32, 34, 38, 40 may be obtained using hardware loopback units 18, 20, 23, 25 on display devices 106, 108, 110, 112. Display devices 106, 108, 110, 112 may have internal hardware to redirect the final stream of rendered audio data 15, 17, 19, 21 to respective hardware loopback units 18, 20, 23, 25. The rendered audio data 15, 17, 19, 21 may include any additional processing performed on the rendered audio data 15, 17, 19, 21 prior to output. The additional processing may include, but is not limited to, equalization, filtering, pitch shift, base boost, and/or any other effect on the audio data. In addition, the rendered audio data 15, 17, 19, 21 may include a mix of audio data for a plurality of applications 10 actively rendering audio for output on display devices 106, 108, 110, 112. For example, display device 112 may include a music application playing music via speaker 40 and a game application outputting audio for a game via speaker 40 at the same time the music application is playing music. The music application and the game application may be actively rendering audio for output via speaker 40 on display device 112. As such, the rendered audio data 21 for display device 112 may include a mix of audio data for the music application and audio data for the game application.

An audio aggregator driver 16 may receive one or more hardware loopback streams 31, 35, 37, 41 with the rendered audio data 15, 17, 19, 21 from one or more display device loopback buffers 24, 26, 28, 30. Hardware loopback stream 31, 35, 37, 41 may accurately represent the audio data being rendered to the speakers 32, 34, 38, 40 on display devices 106, 108, 110, 112 for output.

At 304, method 300 may include combining the rendered audio data from the plurality of hardware loopback streams into a loopback buffer to create aggregated loopback audio data. Audio aggregator driver 16 may generate a single loopback buffer 22 for the rendered audio data 15, 17, 19, 21. Audio aggregator driver 16 may determine a buffer size 12 for the loopback buffer 22. The buffer size 12 may be calculated by multiplying the total number of display devices 106, 108, 110, 112 by the number of channels supported by each of the display devices 106, 108, 110, 112. In the illustrated example, display devices 106, 108, 110, 112 may each support two channels (e.g., speakers 32, 34,

38, 40 may support two channels, right and left). As such, the buffer size 12 may be eight (e.g., four devices multiplied by two channels).

Audio aggregator driver 16 may partition the loopback buffer 22 into a plurality of sections, where the number of sections correspond to the buffer size 12. For example, the loopback buffer 22 may be partitioned into eight sections, where each individual section may correspond to a single channel supported by display devices 106, 108, 110, 112. A sequencing may be applied to the number of sections so that a subset of the number of sections may correspond to a specific display device hardware loopback stream 31, 35, 37, 41. The sequencing may be in response to an order in which display devices 106, 108, 110, 112 are connected and/or in communication with computer device 102. The number of sections allocated to and/or associated with a specific display device hardware loopback stream 31, 35, 37, 41 may be in response to a number of channels supported by display devices 106, 108, 110, 112. For example, each display device 106, 108, 110, 112 may receive two sections in the loopback buffer 22 since display devices 106, 108, 110, 112 support two channels.

Audio aggregator driver 16 may combine the rendered audio data 15, 17, 19, 21 received from display devices 106, 108, 110, 112 into the loopback buffer 22 to create aggregated loopback audio data 14. For example, the rendered audio data 15, 17, 19, 21 received from display device loopback buffers 24, 26, 28, 30 may be placed into different sections of the loopback buffer 22 using a sequencing of the display devices 106, 108, 110, 112 having an arrangement (or relative position) based on a value of an order in which display devices 106, 108, 110, 112 are connected and/or in communication with computer device 102 resulting in the aggregated loopback audio data 14. In addition, loopback buffer 22 may include rendered audio data 15, 17, 19, 21 corresponding to different time/sequences of when audio may be output from display devices 106, 108, 110, 112.

The aggregated loopback audio data 14 may include a mix of audio data for one or more applications actively rendering audio for output on display devices 106, 108, 110, 112. For example, display devices 106, 108, 110, 112 may all include a video conference application where a video conference is currently ongoing on display devices 106, 108, 110, 112. In addition, display device 108 may include a music application playing music via speaker 34 and display device 110 may include a media application playing a movie via speaker 38. The aggregated loopback audio data 14 may include a mix of audio data for the video conference application, the music application, and the media application. As such, audio aggregator driver 16 may represent the aggregated loopback audio data 14 from the various hardware loopback streams 31, 35, 37, 41 as one by using a single loopback buffer 22.

At 306, method 300 may include providing the aggregated loopback audio data to one or more applications on the computer device. Audio aggregator driver 16 may provide the aggregated loopback audio data 14 to one or more applications 10 associated with computer device 102. Applications 10 may want to use the aggregated loopback audio data 14 for various processing. Applications 10 may send a request for the entire loopback buffer 22 to use in the processing. For example, application 10 may want to record the audio emitted by one or more speakers 32, 34, 38, 40 on display devices 106, 108, 110, 112. Application 10 may request the entire loopback buffer 22 and may use the aggregated loopback audio data 14 for the recording.

In addition, applications 10 may send a request for a portion of the aggregated loopback audio data 14 to use in the processing. For example, applications 10 may send a request for a portion of the aggregated loopback audio data 14 relating to a particular time. Application 10 may want to record the audio output by one or more speakers 32, 34, 38, 40 on display devices 106, 108, 110, 112 during the start of a meeting. Application 10 may identify a time period for the start of the meeting and may request a portion of the aggregated loopback audio data 14 corresponding to the time period and may use the portion of the aggregated loopback audio data 14 for the recording. Another example may include applications 10 identifying a particular display device 106, 108, 110, 112 and extracting a portion of the aggregated loopback audio data 14 from the corresponding hardware loopback stream 31, 35, 37, 41 associated with the identified display device 106, 108, 110, 112 for use.

Another example may include application 10 using the aggregated loopback audio data 14 to perform echo cancellation on audio output from one or more displays 106, 108, 110, 112. For example, when an individual is using a microphone 33 on display device 106 on a SKYPE call with a friend while some background music is playing on speaker 32, capture stream 27 may include the audio from microphone 33 (e.g., the individual speaking) and audio from speaker 32 (e.g., background music). Application 10 may use the aggregated loopback audio data 14 in the loopback buffer 22 to cancel out the audio from speaker 32 (e.g., the background music) so the friend does not hear the background music in the call.

At any time applications 10 may access the loopback buffer 22 and may be able to use the same audio data rendered for output by the speakers 32, 34, 38, 40 on any of the display devices 106, 108, 110, 112 through the aggregated loopback audio data 14. As such, applications 10 may have access to an accurate representation of audio output by the display devices 106, 108, 110, 112 for any additional processing and/or use by applications 10.

Figure 4:
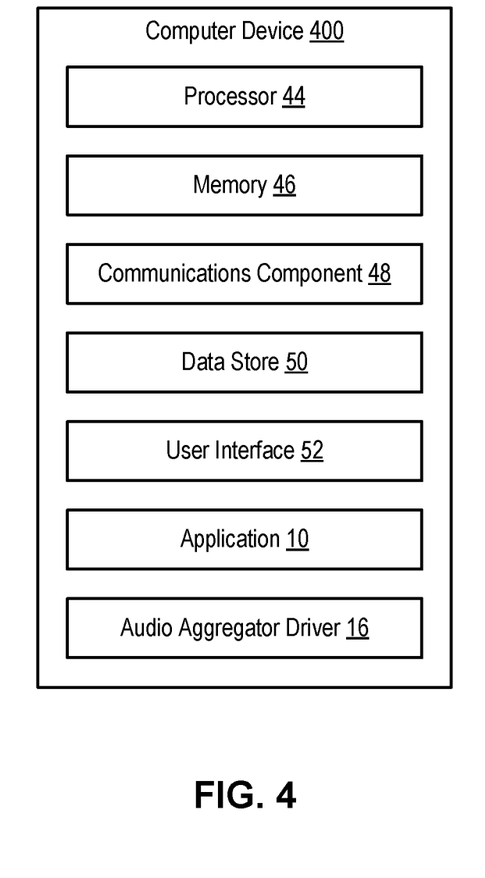
FIG. 4 is a schematic block diagram of an example device in accordance with an implementation of the present disclosure.

Referring now to FIG. 4 an example computer 400 that may be configured as computer device 102 in accordance with an implementation includes additional component details as compared to FIG. 1. In one example, computer 400 may include processor 44 for carrying out processing functions associated with one or more of components and functions described herein. Processor 44 can include a single or multiple set of processors or multi-core processors. Moreover, processor 44 can be implemented as an integrated processing system and/or a distributed processing system.

Computer 400 may further include memory 46, such as for storing local versions of applications being executed by processor 44. Memory 46 can include a type of memory usable by a computer, such as random access memory (RAM), read only memory (ROM), tapes, magnetic discs, optical discs, volatile memory, non-volatile memory, and any combination thereof. Additionally, processor 44 may include and execute operating system 111 (FIG. 1).

Further, computer 400 may include a communications component 48 that provides for establishing and maintaining communications with one or more parties utilizing hardware, software, and services as described herein. Communications component 48 may carry communications between components on computer device 102, as well as between computer device 102 and external devices, such as devices located across a communications network and/or devices serially or locally connected to computer device 102. For example, communications component 48 may include one or more buses, and may further include transmit chain components and receive chain components associated with a transmitter and receiver, respectively, operable for interfacing with external devices.

Additionally, computer 400 may include a data store 50, which can be any suitable combination of hardware and/or software, that provides for mass storage of information, databases, and programs employed in connection with implementations described herein. For example, data store 50 may be a data repository for applications 10 and/or audio aggregator driver 16.

Computer 400 may also include a user interface component 52 operable to receive inputs from a user of computer device 102 and further operable to generate outputs for presentation to the user. User interface component 52 may include one or more input devices, including but not limited to a keyboard, a number pad, a mouse, display (e.g., which may be a touch-sensitive display), a navigation key, a function key, a microphone, a voice recognition component, any other mechanism capable of receiving an input from a user, or any combination thereof. Further, user interface component 52 may include one or more output devices, including but not limited to a display, a speaker, a haptic feedback mechanism, a printer, any other mechanism capable of presenting an output to a user, or any combination thereof.

In an implementation, user interface component 52 may transmit and/or receive messages corresponding to the operation of applications 10 and/or audio aggregator driver 16. In addition, processor 44 executes applications 10 and/or audio aggregator driver 16, and memory 46 or data store 50 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a memory to store data and instructions;
at least one processor configured to communicate with the memory; and
an operating system configured to communicate with the memory and the at least one processor, wherein the operating system is operable to:
receive a plurality of hardware loopback streams with rendered audio data from a plurality of display devices in communication with the computer device, wherein each hardware loopback stream of the plurality of hardware loopback streams corresponds to one display device of the plurality of display devices;
determine a buffer size for a loopback buffer by multiplying a total number of the plurality of display devices by a number of channels supported by the plurality of display devices;
partition the loopback buffer into a number of sections equal to the buffer size;
determine a subset of the number of sections for each display device of the plurality of display devices, wherein the subset of the number of sections for each display device correspond to the number of channels supported by each display device of the plurality of display devices;
combine the rendered audio data from the plurality of hardware loopback streams into the loopback buffer to create aggregated loopback audio data; and
provide the loopback buffer with the aggregated loopback audio data to one or more applications executing on the computer device.

2. The computer device of claim 1, wherein the plurality of hardware loopback streams are associated with at least one hardware loopback unit on each display device that obtains the rendered audio data on each display device of the plurality of display devices.

3. The computer device of claim 1, wherein the rendered audio data includes audio data for a plurality of applications actively rendering the audio data for output on the plurality of display devices.

4. The computer device of claim 1, wherein the one or more applications use the aggregated loopback audio data for at least one of echo cancellation or creating a recording.

5. The computer device of claim 1, wherein the operating system is further operable to:
determine an order for the rendered audio data in response to a sequencing of the plurality of display devices; and
combine the rendered audio data into the loopback buffer according to the order.

6. The computer device of claim 1, wherein the operating system is further operable to:
place the rendered audio data received from each display device in the subset of the number of sections that corresponds to each display device of the plurality of display devices.

7. A method for aggregating hardware loopback streams of a plurality of display devices in communication with a computer device, the method comprising:
receiving, at an operating system executing on the computer device, a plurality of hardware loopback streams with rendered audio data from the plurality of display devices in communication with the computer device, wherein each hardware loopback stream of the plurality of hardware loopback streams corresponds to one display device of the plurality of display devices;
combining the rendered audio data from the plurality of hardware loopback streams into a loopback buffer to create aggregated loopback audio data;
determining a buffer size for the loopback buffer by multiplying a total number of the plurality of display devices by a number of channels supported by the plurality of display devices;
partitioning the loopback buffer into a number of sections equal to the buffer size;
determining a subset of the number of sections for each display device of the plurality of display devices, wherein the subset of the number of sections for each display device correspond to the number of channels supported by each display device of the plurality of display devices; and
providing the loopback buffer with the aggregated loopback audio data to one or more applications executing on the computer device.

8. The method of claim 7, wherein the plurality of hardware loopback streams are associated with at least one hardware loopback unit on each display device that obtains the rendered audio data on each display device of the plurality of display devices.

9. The method of claim 7, wherein the rendered audio data includes audio data for a plurality of applications actively rendering the audio data for output on the plurality of display devices.

10. The method of claim 7, wherein the one or more applications use the aggregated loopback audio data for at least one of echo cancellation or creating a recording.

11. The method of claim 7, wherein the method further comprises:
determining an order for the rendered audio data in response to a sequencing of the plurality of display devices; and
combining the rendered audio data into the loopback buffer according to the order.

12. The method of claim 7, wherein the method further comprises:
placing the rendered audio data received from each display device in the subset of the number of sections associated with each display device of the plurality of display devices.

13. A non-transitory computer-readable medium storing instructions executable by a computer device, comprising:
at least one instruction for causing the computer device to receive a plurality of hardware loopback streams with rendered audio data from a plurality of display devices in communication with the computer device, wherein each hardware loopback stream of the plurality of hardware loopback streams corresponds to one display device of the plurality of display devices;
at least one instruction for causing the computer device to combine the rendered audio data from the plurality of hardware loopback streams into a loopback buffer to create aggregated loopback audio data;

at least one instruction for causing the computer device to determine a buffer size for the loopback buffer by multiplying a total number of the plurality of display devices by a number of channels supported by the plurality of display devices;

at least one instruction for causing the computer device to partition the loopback buffer into a number of sections equal to the buffer size;

at least one instruction for causing the computer device to determine a subset of the number of sections for each display device of the plurality of display devices, wherein the subset of the number of sections for each display device correspond to the number of channels supported by each display device of the plurality of display devices; and at least one instruction for causing the computer device to provide the loopback buffer with the aggregated loopback audio data to one or more applications executing on the computer device.

14. The non-transitory computer-readable medium of claim 13, further comprising:

at least one instruction for causing the computer device to place the rendered audio data received from each display device in the subset of the number of sections associated with each display device of the plurality of display devices.

\* \* \* \* \*